United States Patent Office 3,846,207
Patented Nov. 5, 1974

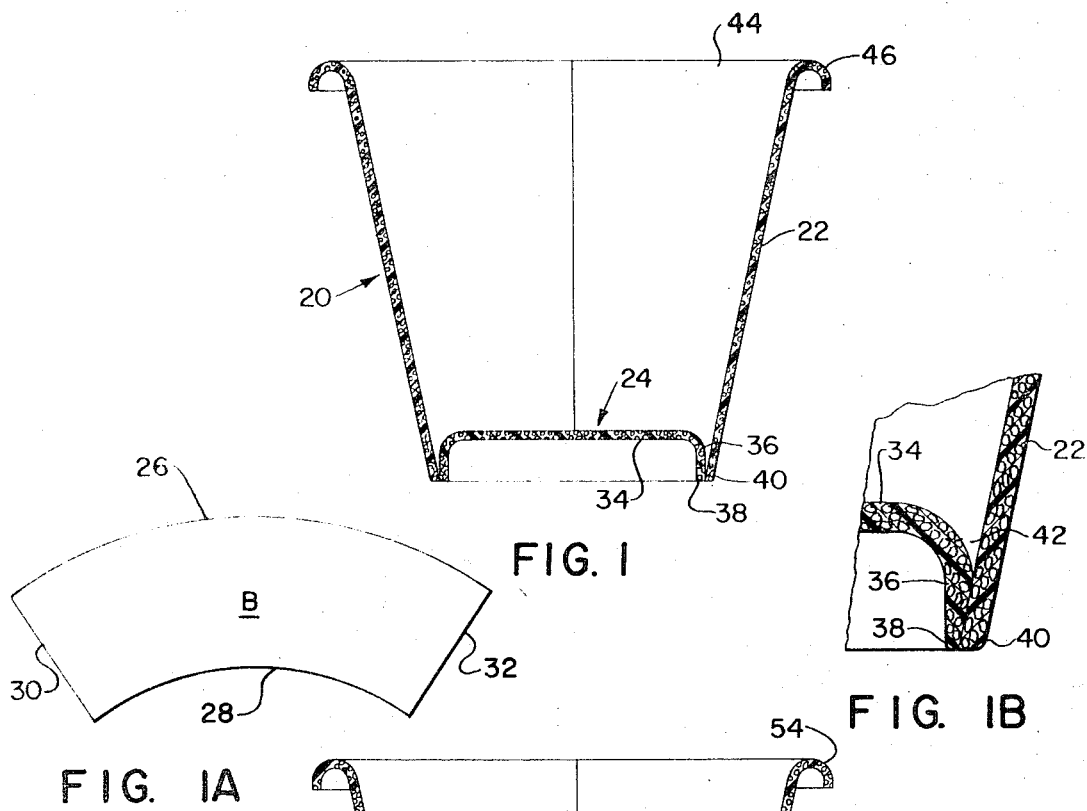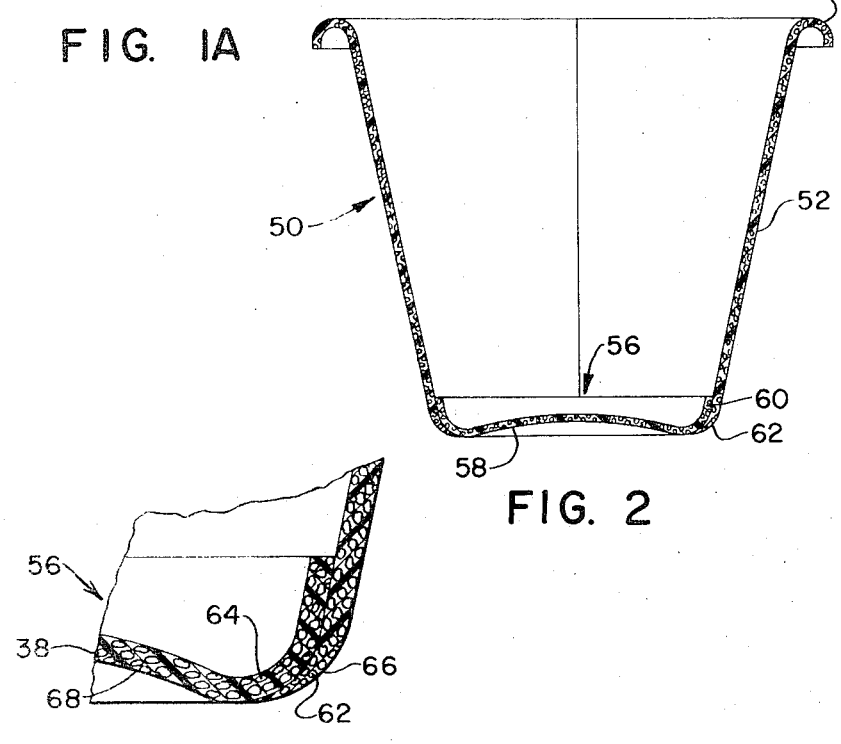

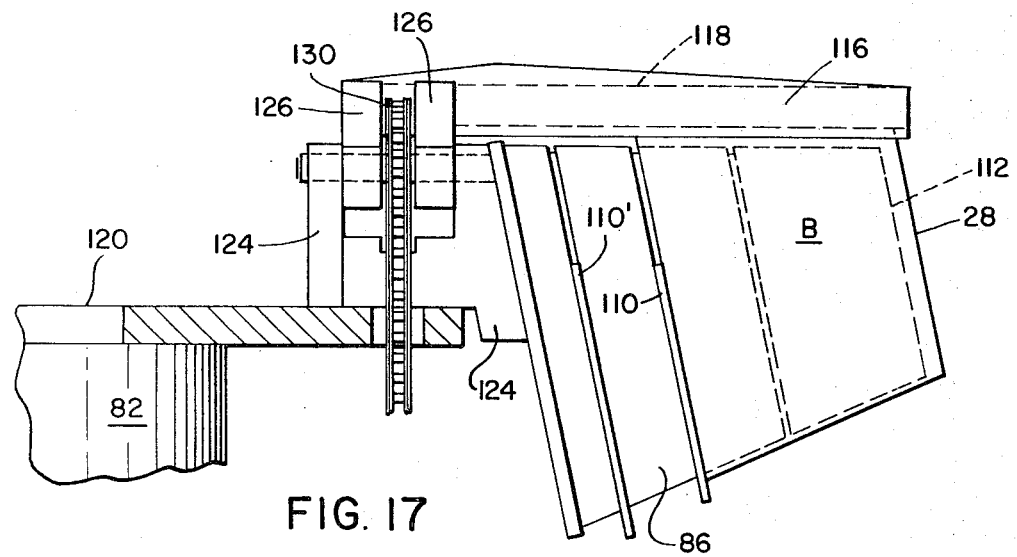
FIG. 17
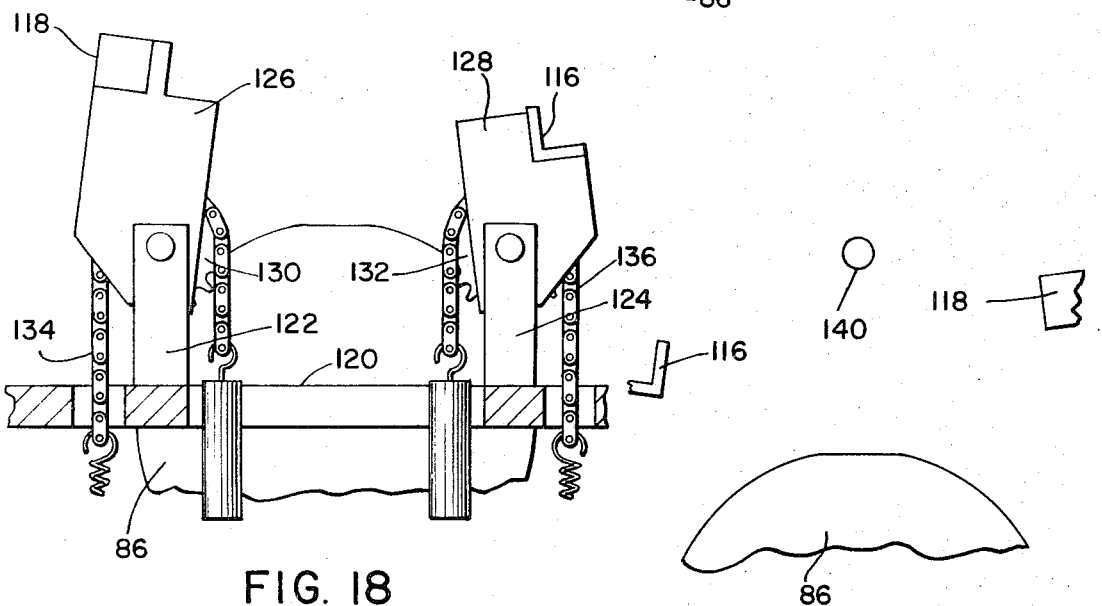
FIG. 18
FIG. 19
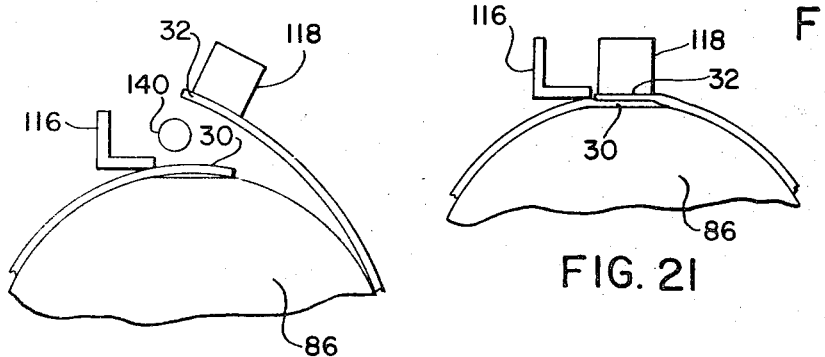
FIG. 20
FIG. 21

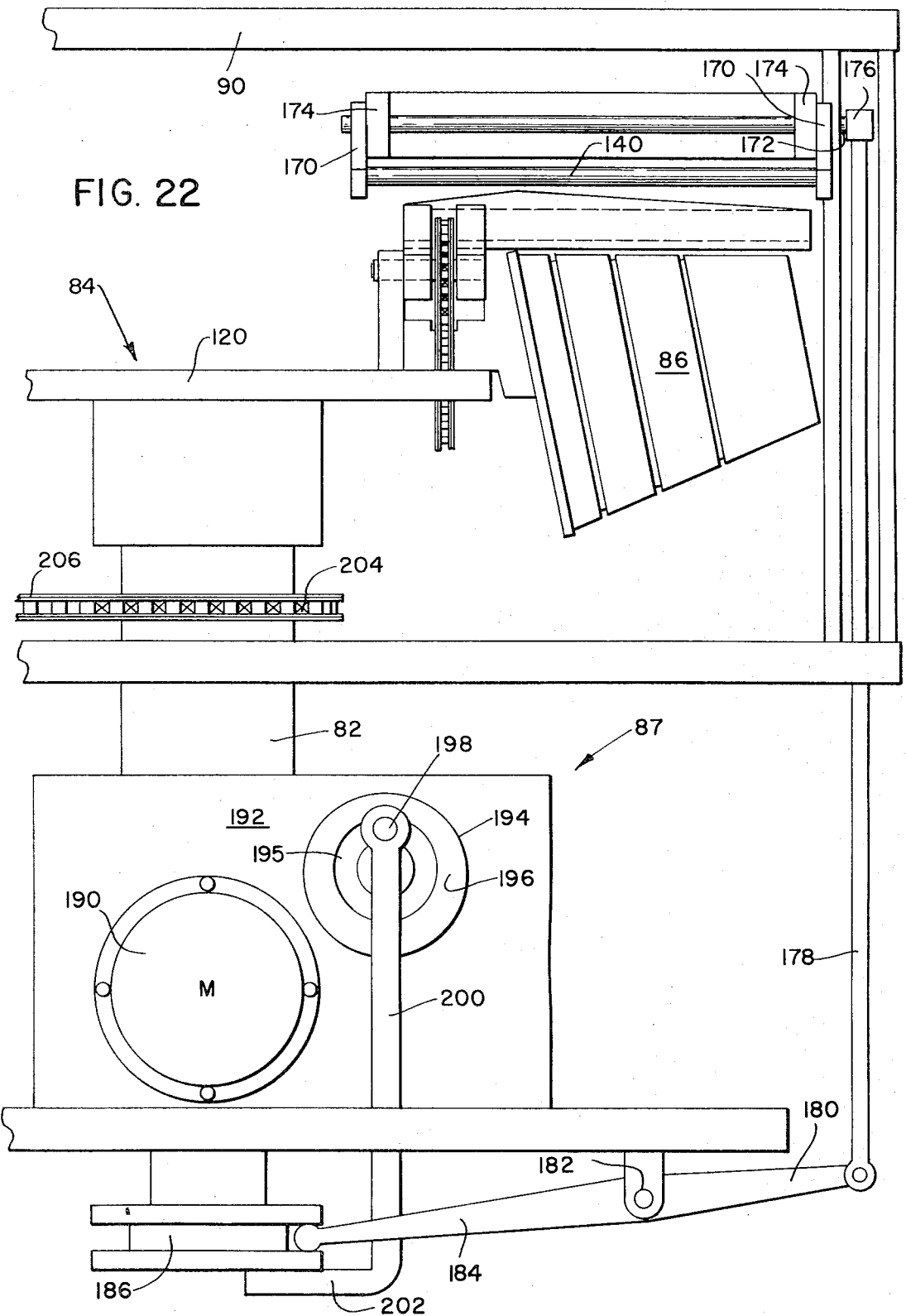

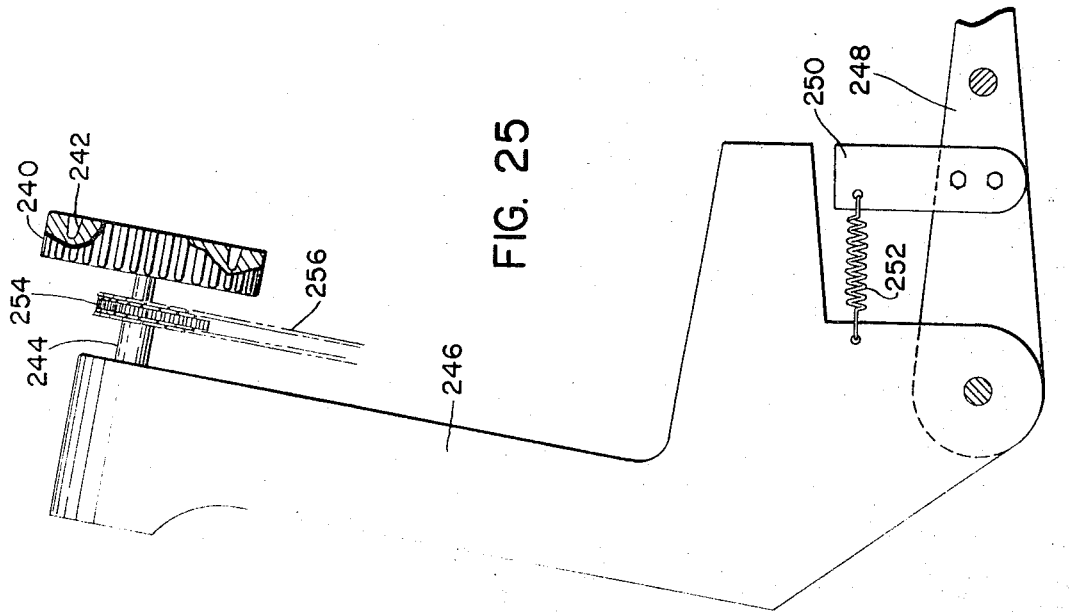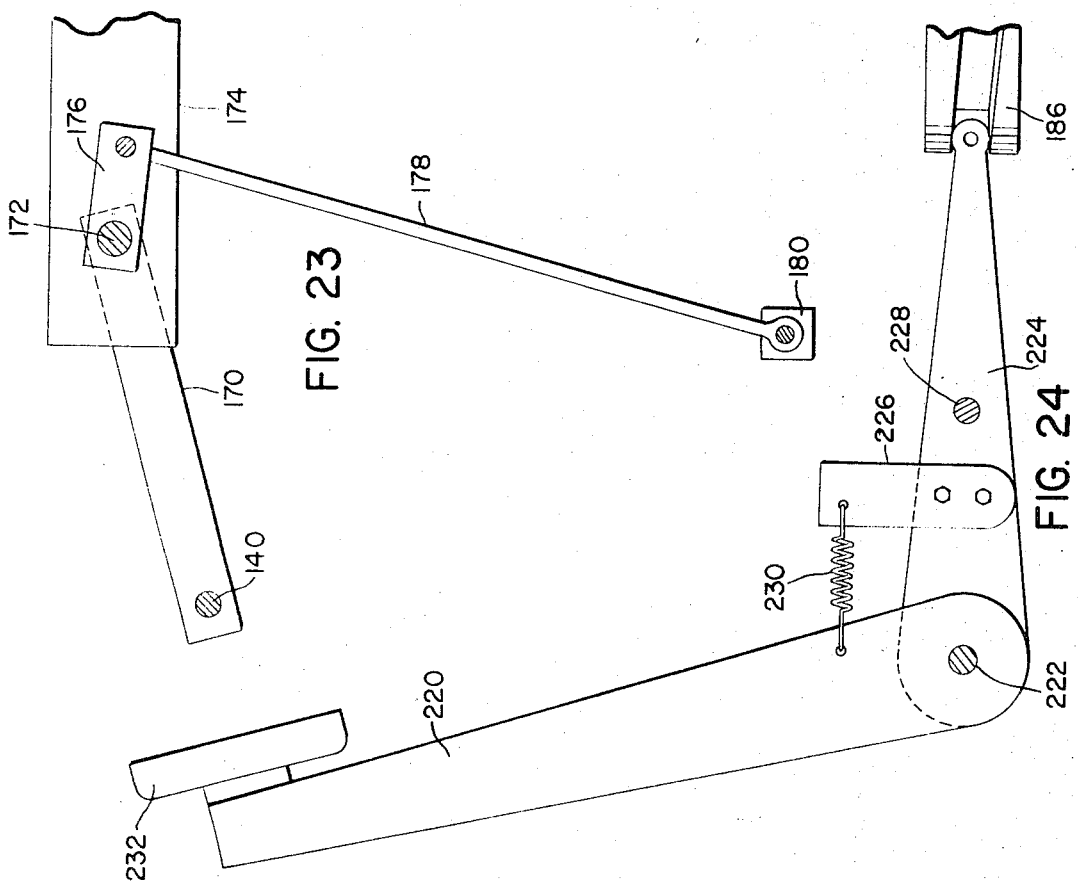

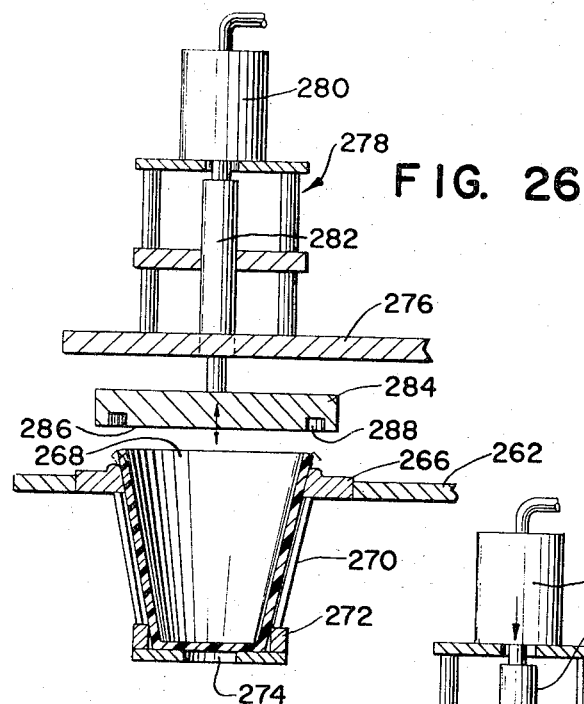
FIG. 26
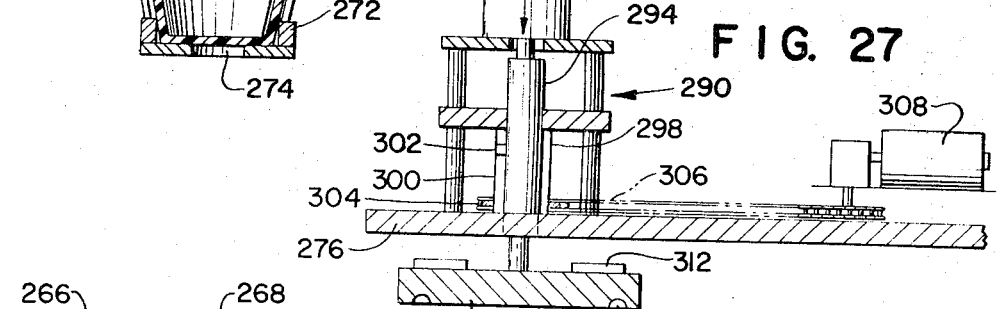
FIG. 27
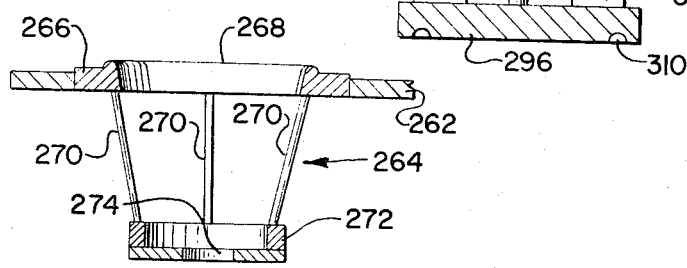
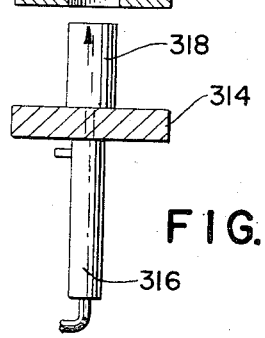
FIG. 28

3,846,207
APPARATUS FOR MAKING PLASTIC BUCKETS
Gene MacDaniel, Lithonia, and Howell T. McElvy, Decatur, Ga., assignors to Sweetheart Plastics, Inc., Wilmington, Del.
Original application Feb. 2, 1970, Ser. No. 7,955, now Patent No. 3,673,033. Divided and this application Apr. 17, 1972, Ser. No. 244,985
Int. Cl. B31b 3/02, 3/60
U.S. Cl. 156—443　　　　　　　　　　　　9 Claims

ABSTRACT OF THE DISCLOSURE

A method and machine for producing two-piece containers wherein a turret carrying a plurality of container forms each has applied to it a side wall and a separately preshaped bottom, an as the turret rotates through successive stations, the side seam of the side wall is heat sealed closed, and the preformed bottom is heat sealed to the bottom of the side wall. Thereafter on a secondary turret the container rim is rolled and the fully formed container is ejected from the machine.

---

This application is a divisional application of Ser. No. 7,955, filed Feb. 2, 1970, and now issued as U.S. Pat. No. 3,673,033.

This invention relates to relatively large two-piece insulated containers and more particularly comprises a new and improved method and apparatus for forming such containers.

There is at the present time a growing demand for disposable containers in large sizes. This growth in part is the result of the rapidly growing business of franchise take-out food vendors such as the roadside fried chicken stands, as well as the result of rapidly increasing labor costs that make reusable containers in all industries prohibitively expensive. While in the disposable container industry plastic has captured a significant percentage of the market in small container sizes, thus far the larger containers of the one gallon size range are almost exclusively still made of paper. This is particularly true in the insulated bucket or tub field where heretofore no one has developed a commercially competitive insulated plastic tub. Conventionally the large tubs used for example as chicken buckets are made of double wrapped paper. The heavy duty double wrapped paper buckets are expensive, have only limited insulating properties, and generally are subject to the same failings as paper food containers made in smaller sizes, i.e. they have a taste and odor which effects the contents, they absorb moisture, etc. Copending application Ser. No. 879,448, filed Nov. 24, 1969, now Pat. No. 3,664,568, entitled Insulated Plastic Bucket, describes and claims one product which may be produced by the method and apparatus of this invention.

Heretofore efforts to make large containers of plastic have taken several directions, but none thus far have produced a container that is satisfactory for the purposes served by the double wrapped paper buckets. The large injection molded containers are too expensive to manufacture to be considered truly disposable, and they have poor insulating properties. Efforts to make the containers in one piece from sheet foam by forming techniques have been successful because of the thickness of the stock and the necessary depth of the draw.

The method and apparatus of this invention embody the concept of preshaping the bottom of the container and applying it to a container form where it is joined to the side wall which is wrapped about the foam. The side wall seam is heat sealed closed, and the preshaped bottom is heat sealed to the side wall, and the side wall is subsequently stiffened by rolling the rim.

In the drawing:

FIG. 1 is a cross-sectional view of one container that may be manufactured by the method and apparatus of this invention;

FIG. 1A is a plan view of the side wall blank in the container of FIG. 1;

FIG. 1B is a fragmentary detail of the container of FIG. 1;

FIG. 2 is a cross-sectional view of another container that may be manufactured by the method and apparatus of this invention;

FIG. 17 is a detail view of one of the frustoconical forms and other associated parts;

FIG. 18 is a rear view of the form of FIG. 17 with the side seam sealing mechanism open;

Figure 3:
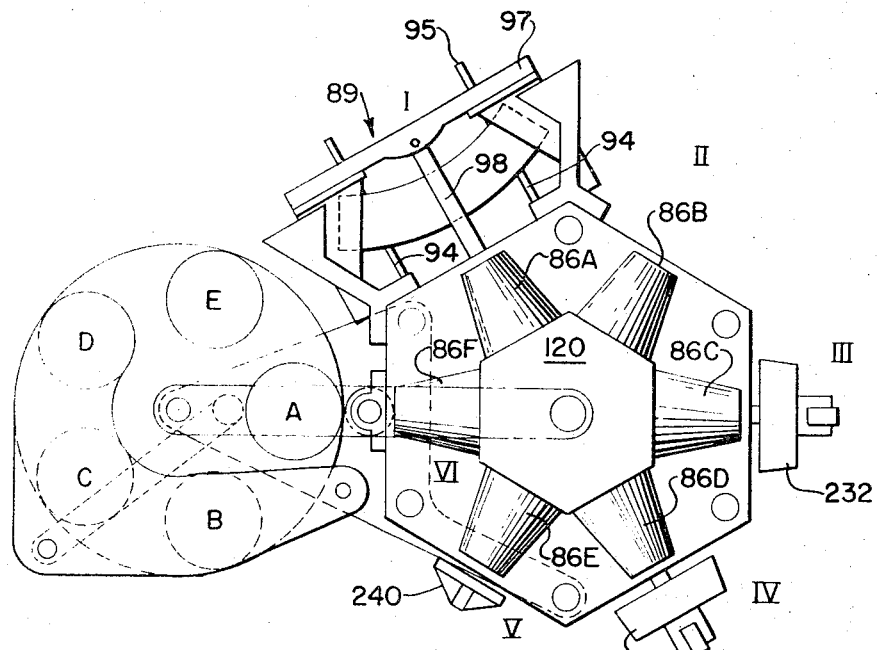
FIG. 3 is a plan view of the apparatus of this invention.
Figure 4:
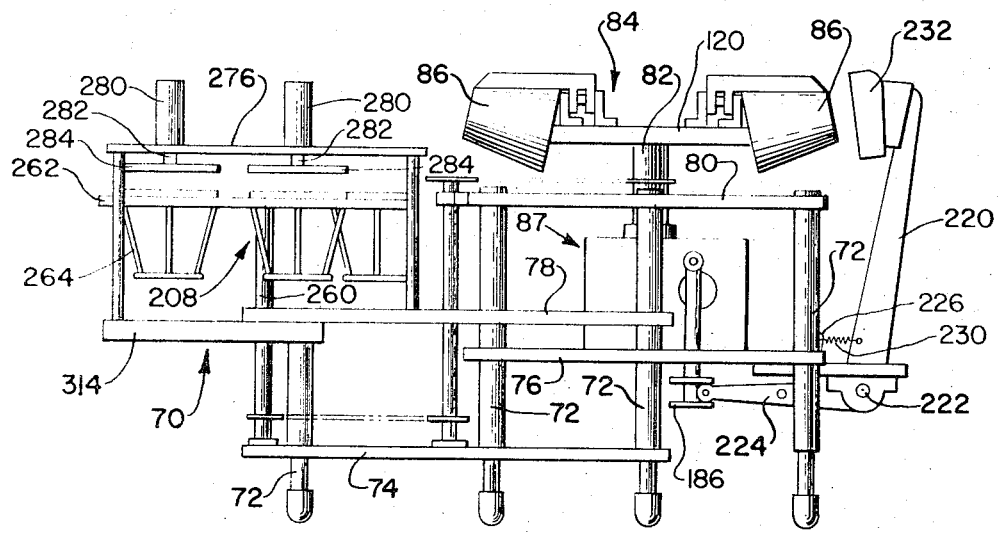
FIG. 4 is a side view of the apparatus of FIG. 3.

FIGS. 19–21 diagrammatic illustrations of the sequence of steps to seal the side seam;

FIG. 22 is a fragmentary side view of the apparatus of FIGS. 3 and 4 showing the main turret drive and the actuating mechanism for the side seam heater;

FIG. 23 is a side view of the actuating mechanism for the side seam heater;

FIG. 24 is a side view of the bottom edge heating assembly;

FIG. 25 is a side view of the bottom edge spinning and sealing assembly;

FIG. 26 is a side view of the rim heating assembly on the rimming turret;

FIG. 27 is a side view of the rim rolling assembly on the rimming turret;

FIG. 28 is a side view of the ejecting mechanism of the rimming turret; and

FIGS. 29–32 illustrate the sequence of steps for making the container of FIG. 2, as the steps may be performed on the apparatus of this invention.

Before describing the method and apparatus of this invention, two products which may be produced by it will be described. They are shown in FIGS. 1 and 2.

The bucket 20 shown in FIG. 1 has a side wall 22 and a bottom 24. The side wall is made from a blank shown in FIG. 1A having curved top and bottom edges 26 and 28 and diverging side edges 30 and 32 so that when the side wall is rolled into the container shape it is frustoconical with the desired side wall taper to facilitate nesting. The side wall 22 and the bottom 24 are made from expanded styrene sheets and may typically have a stock thickness of approximately .112 inch and weigh approximately 19 grams per square foot with a cell size of 4 to 5 mils. It is to be understood that these containers and the dimensions given are merely exemplary of what may be made by the method and apparatus of this invention, and the method and apparatus may be used to make containers of a very wide range of sizes and shapes.

The side edges 30 and 32 of the side wall blank are overlapped and compressed together in the manner shown in FIGS. 19 to 21 and described in detail below to form a liquid tight seam running from top to bottom of the side wall. The total thickness of the overlapped portion of the side wall is less than twice the stock thickness and preferably does not appreciably exceed the single stock thickness of the material.

The bottom of the container is preshaped before assembly from sheet stock, either by conventional forming techniques, matched molding, or other process. When formed, the bottom is configured as shown in FIG. 1 with a central portion 34 and a peripheral skirt 36 which extends downwardly from the central portion 34 generally with a very slightly downward flare of approximately 3°. The outer diameter of the skirt 36 at the bottom edge 38 is equal to or slightly larger than the inner diameter of the bottom edge 40 of the side wall 22 so that when the bottom is assembled as described below the outer surface of the skirt 36 at its lower edge engages the inner surface of the lower margin 40 of the side wall. When the bottom 24 and the side wall 22 are assembled together on the machine of this invention the lower margin 40 of the side wall is fused through a very small portion of its height as is suggested in FIG. 1B. From that point the skirt and side wall diverge in an upward direction to form a well 42 which is particularly desirable as a grease trough when buckets are used to contain fried foods such as chicken. In a one gallon tub size, typically the height of skirt 36 measured from its lower margin to the upper surface of the central portion 34 is approximately $1\frac{3}{16}$ inch, and the trough 42 has a height of approximately $2\frac{5}{32}$ inch. The volume of the trough is of course a function of the taper of the side wall 32, which typically may be approximately 12°.

To enhance the appearance of the tub, broaden its applications, and increase its stiffness at the mouth 44, the rim 46 is rolled as shown in FIG. 1, and preferably the material of the rim is somewhat expanded so as to further increase its stiffness. The manner in which the rim is shaped is described in detail below also.

The container 50 shown in FIG. 2 differs from the container 20 of FIG. 1 in the construction of the bottom. The container 50 has a side wall 52 with a rolled rim 54 identical to that of FIG. 1. The bottom includes a generally horizontal central portion 58 which may be dished upwardly if desired to increase its stiffness and oppose sagging, and the bottom also includes a peripheral skirt 60 which extends upwardly from the margin of the central portion 58. The skirt 60 is upwardly flared so that it forms the same angle with the vertical as does the side wall 52. This flare may typically be an angle of 12°.

In FIG. 2A the details of the connection between the skirt 60 and the side wall 52 are shown. The bottom 56 is preformed in the shape shown in FIG. 2, and the axial extent of the skirt 60 is substantially the same as the skirt 36 in the embodiment of FIG. 1. The skirt 60 is heat sealed to the inner side of the side wall 52, and the bottom 62 of the side wall is wrapped about the radius 64 which joins the skirt 60 and the wall 58 to form a smooth juncture between the side wall of the container and the bottom. The lower edge 62 of the side wall where it wraps about the radius 64 is compressed so as to form a smooth union between the outer surface 66 of the side wall and the lower surface 68 of the bottom 58.

The apparatus of FIGS. 3 to 28 forms the containers of FIGS. 1 and 2, and is described in connection with FIGS. 5–7 and 29–32 which show the sequence of steps in assembling the containers.

The machine shown in FIGS. 3 and 4 includes a frame 70 having a number of adjustable legs 72 joined by a number of horizontal braces and plates 74, 76, and 78 to provide a stable platform for the assembly and support many of the parts of the machine.

A bed 80, hexagonal in shape, is supported adjacent the top of a number of the legs on the right side of the machine as viewed in FIGS. 3 and 4, and a shaft 82 extends upwardly through the bed 80 and forms the center of a six station forming turret 84. The turret includes in the form shown, six frustoconical container forms 86 which move from station to station about the axis of the shaft 82 when the shaft rotates. In FIG. 3, form 86A is disposed in station I, form 86B in station II, form 86C in station III, form 86D in station IV, form 86E in station V, and form 86F in station VI. The drive 87 provided for the shaft 82 indexes the turret so that the forms move step by step successively from station I to VI. The forms stop at each of the stations while various operations are performed in the assembling of the container.

Briefly, the steps performed in stations I to VI are as follows:

Station I—side wall blank B is applied to the form.

Figure 5:
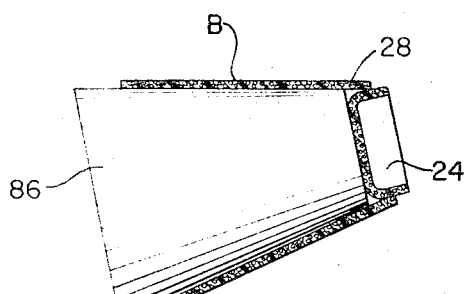
FIGS. 5–7 illustrate successive steps performed by the apparatus of FIGS. 3 and 4 to make the container of FIG. 1.
Figure 13:
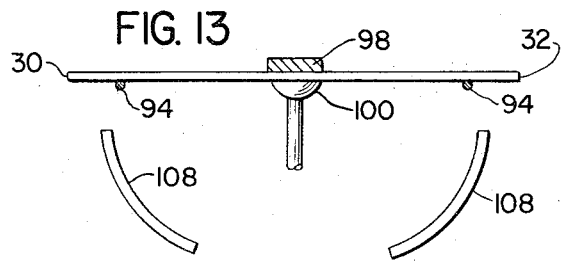
FIGS. 13 to 16 are diagrammatic illustrations of the steps of drawing the blanks from the magazine to the transport mechanism.

Station II—the preformed bottom 24 is inserted within the margin of the side wall as suggested in FIG. 5, and the side edges 30 and 32 of the blank B are heated.

Figure 6:
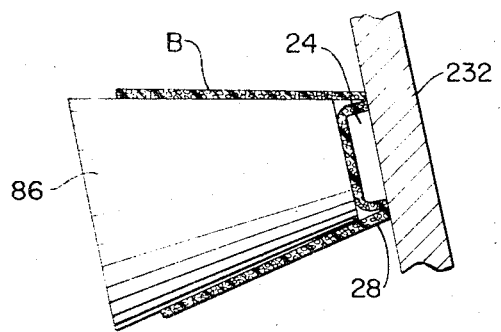
Figure 15:
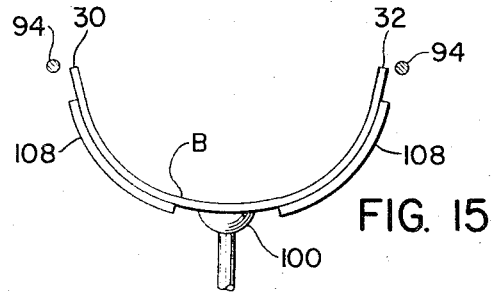

Stations III and IV—the bottom edges of the bottom and side wall blank are heated as suggested in FIG. 6, and the previously heated side edges 30 and 32 are firmly pressed together to seal them in overlapped relation as suggested in FIG. 21.

Figure 7:
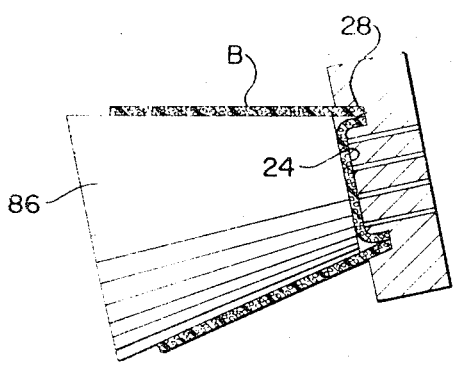
Figure 16:
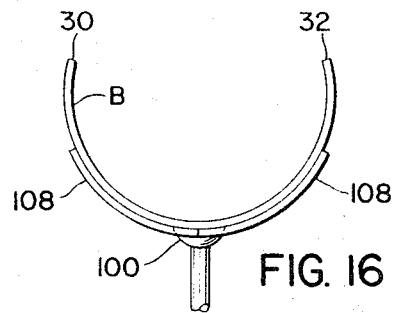

Station V—the heated bottom and side wall margin are spun to form a seal as suggested in FIG. 7.

Station VI—the container is removed from the form and placed on the second turret of the machine for rim forming.

The details of the machine and the steps performed in each station are described below under appropriate headings.

STATION I—MAGAZINE

In station I the side wall blanks B are applied one at a time to the container forms 86 as the forms enter and stop in that station. In FIGS. 8 to 16 the machine and operation are shown.

Figure 8:
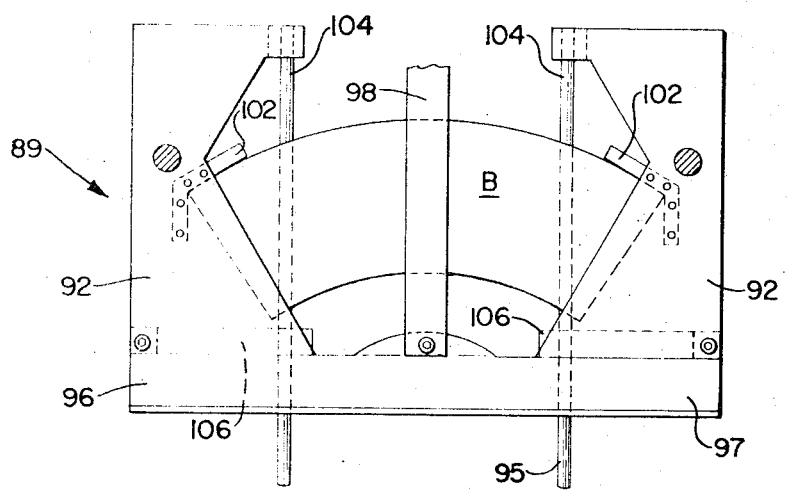
FIG. 8 is a plan view of the side wall blank magazine forming part of the apparatus of FIGS. 3 and 4.
Figure 9:
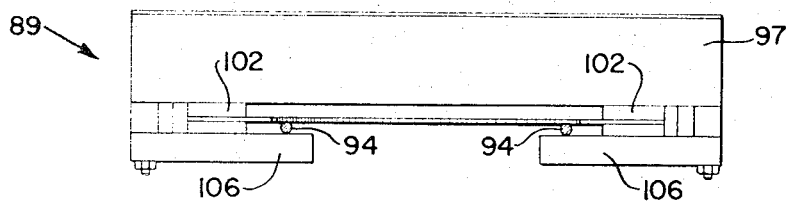
FIG. 9 is a front view of the magazine.
Figure 10:
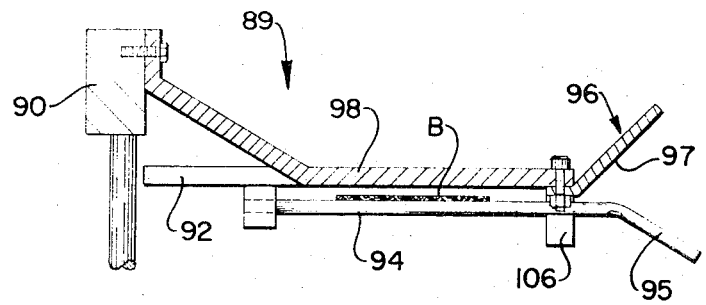
FIG. 10 is a side view of the magazine.

In FIGS. 8 to 10 the loading magazine 89 is shown supported on frame member 90. The magazine includes a pair of spaced generally horizontal plates 92 mounted slightly above a pair of support rods 94 which together sandwich the flat side wall blank B. A guide plate 96 having an upturned lip 97 is secured to the front ends of the plates 92 while the forward ends 95 of the support rods 94 are bent downwardly to form an opening to the area between the support rods and plate to introduce the blank.

A substantial horizontal gap exists between the plates 92, and the blank B is exposed between them. A center bar 98 bridges the gap from front to rear so as to form a top support for the blank B when an upwardly directed force is exerted against it by the mechanical movement of suction cups 100 that form part of the transport mechanism 99 shown in FIGS. 11–16. An operator standing beside the machine feeds the blanks one at a time into the slot so that the blank rests on the bars 94 below the plates 92, and stops 102 secured to the lower surfaces of the plates 92 position the blank accurately in the magazine. As the rods 94 are suspended from their rear ends 104 to the bottom of plates 92, they are somewhat flexible, and front end rod supports 106 underlie the outer ends of the rods to prevent them from sagging or bending appreciably. Thus each blank B placed in the magazine is supported from beneath by the spaced bars 94.

Figure 14:
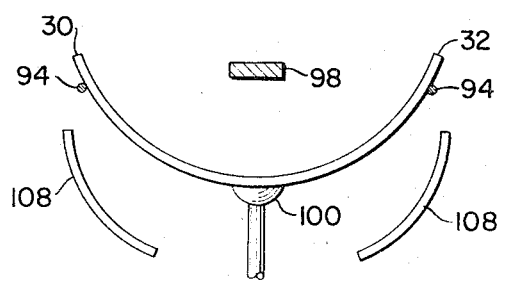
Figure 11:
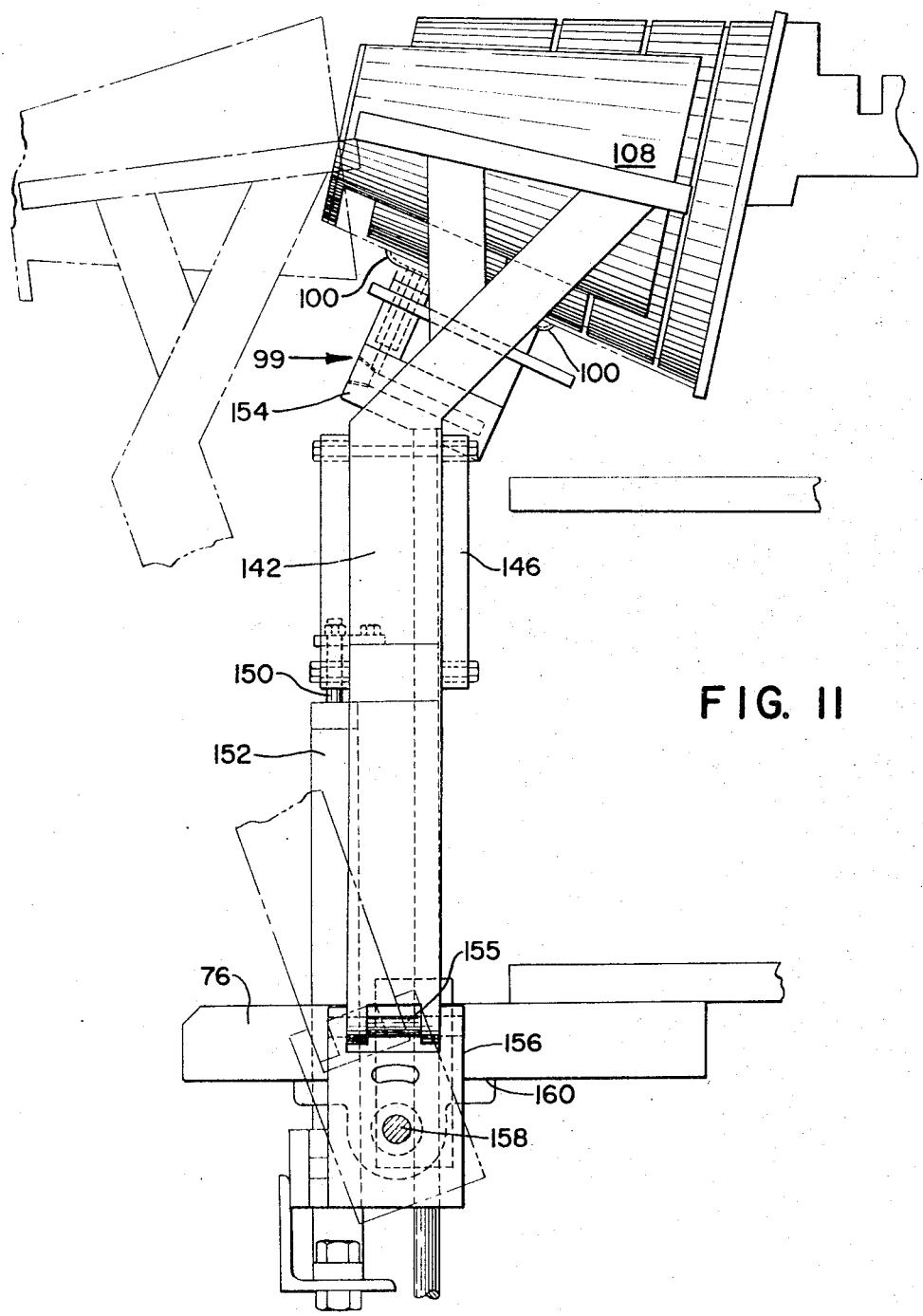
FIG. 11 is a side view of the transport mechanism for applying the blanks to the forms.
Figure 12:
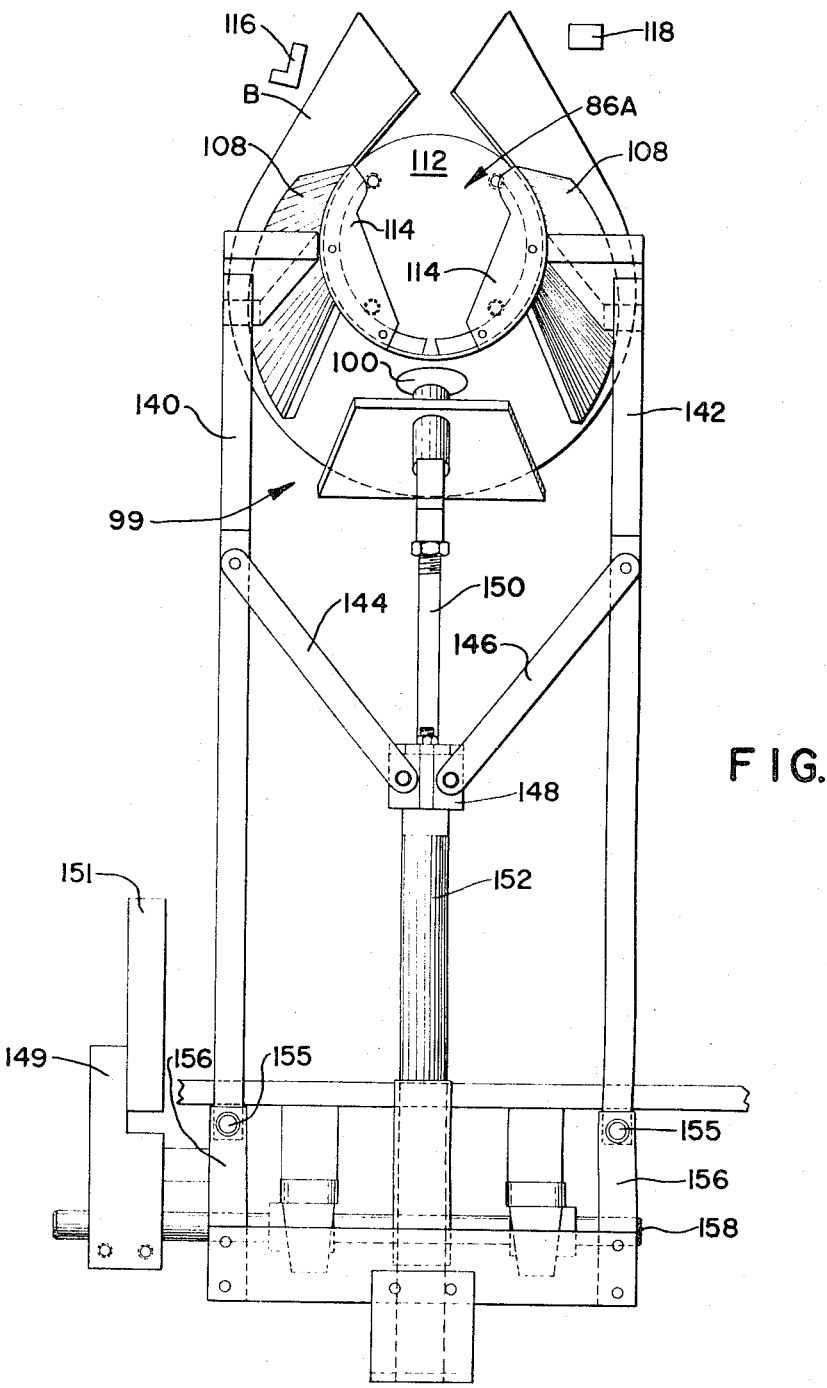
FIG. 12 is a front view of the transport mechanism.

From the magazine the blanks are drawn one at a time downwardly between the bars 94 onto folding plates 108 forming part of the transport mechanism 99 shown in FIGS. 11 and 12, and after folding each blank is placed about the form 86 in station I. FIGS. 13 to 16 show schematically how the blanks are drawn from the bars 94 onto the folding plates. A pair of suction cups 100 disposed one behind the other move upwardly in station I and grasp the bottom side of the blank B, immediately beneath the bridge 98. In this way firm suctional contact is made with the blank, and as the suction cups move downwardly between the folding plates 108 of the transport mechanism, which are widely separated, the blank B bows as shown in FIG. 14 because the blank is wider than the gap between the stationary bars 94. Downward travel of the suction cup continues until the side edges 30 and 32 of the blank B clear the rods 94, and simultaneously the folding plates 108 move toward one another until they ultimately engage the blank. While the suction cups continue to hold the blank, the folding plates move to their innermost positions where they engage the blank firmly and form the blank into a rather deep U-shaped configuration as suggested in FIG. 16. The radius of curvature of the blank as it is supported by the folding plates 108 just about matches the radius of the form 86, and therefore when the folding plates 108 move toward the center of the machine in the direction of the form 86 as suggested in FIG. 11, the blank slips about the cone. The manner in which the suction cups assembly and the folding plates move so as to draw the blanks from the magazine and place them on the form 86 is clearly illustrated in FIGS. 11 and 12.

FRUSTOCONICAL FORMS

In FIG. 17 some of the details of one form are shown. A pair of removable bands 110 and 110' are mounted on the cone-shaped form 86, and these bands act as stops to accurately position each blank B as it is placed about the cone in the first instance by the folding plates 108. It will be noted that the blank B extends from the first stop 110 to a position wherein its bottom edge 28 lies beyond the bottom 112 of the form 86. End plates 114 (see FIG. 12) carried by the folding plates 108 also serve as stops to push the blank B against the stop 110 on the form 86. When larger containers are being made, the stop 110' is utilized and the stop 110 is removed.

STATION I—TRANSPORT MECHANISM

In FIGS. 11 and 12 the transport mechanism is shown in detail. The folding plates 108 are each shown carried separately by two generally vertically extending arms 140 and 142 which in turn are joined together adjacent their midsections by links 144 and 146. The links are connected at their extremes to the respective arms, and at their adjacent ends they are connected to block 148 in turn mounted on and moveable with the rod 150 of cylinder 152. The rod 150 at its upper end carries the pair of suction cups 100 which are connected to a fitting 154 so that they may be joined to a vacuum pump so as to activate the suction cups.

The bottoms of the arms 140 and 142 are pivotally connected by pins 155 to posts 156 which in turn are mounted on shaft 158 supported on bearings 160 secured to the bottom frame member 76.

When the cylinder 152 is energized to elevate rod 150 and suction cups 100, the block 148 also rises and the links 144 and 146 spread the arms 140 and 142 so as to separate the folding plates 108. The links 144 and 146 assume a substantially horizontal position when the block 148 is elevated on the rod 150, and the arms 140 and 142 pivot on the pins 155. Thus the suction cups and folding plates operate together in a manner suggested in FIGS. 13–16 so as to perform the folding operation.

In order to place the blank B about the form 86 after it is taken from the magazine, the whole transport mechanism moves rearwardly toward the center of the turret as suggested in FIG. 11. In that figure the broken line position is that assumed by the assembly when the blanks are being drawn down from the magazine 89 onto the folding plates 108. After the blank is folded and held firmly on the plates, the mechanism moves to the position shown in full lines wherein the plates 108 and blank B surround the form 86. This motion is carried out by lever 149 which is carried by the shaft 158. When the lever is pulled at the top toward the center of the machine by rod 151, the shaft 158 turns through approximately 20° and carries the arms 140 and 142 and associated parts with it, and the blank is properly oriented on the form as described above in connection with FIG. 17.

STATIONS I–IV—SEALING SIDE SEAM

The apparatus described above places the side wall blank B about the form 86. In stations I–IV the apparatus shown in FIGS. 17 to 23 serves to position the side edges 30 and 32 of the blank B in place and heat seal them together.

Each of the six forms 86 has a first pressure bar 116 on the left as viewed from the small diameter end of the form for holding the lower edge 30 of the two edges of the blank in place, and a second pressure bar 118 on the right which applies pressure to the overlapped edges to cause them to fuse together after they have been sufficiently heated. The pressure bars 116 and 118 are supported on the turret platform 120 which is mounted on shaft 82 and rotates with it. Mounting brackets 122 and 124 that carry the form 86 each pivotally supports a pair of spaced hinge plates 126 and 128 that in turn carry the pressure bars 116 and 118. Disposed between the pairs of plates 126 and 128 are sprockets 130 and 132 respectively (see FIG. 17) that engage chains 134 and 136 (see FIG. 18) to cause the bars 116 and 118 to pivot through the various positions shown in FIGS. 19 to 21. In FIGS. 18 and 19 the two pressure bars 116 and 118 are shown in their extreme open position wherein neither is positioned to engage the blank edges on the form 86, and neither is in a position to interfere with the application of the blank to the form. The raised edges of the blank B as shown in FIG. 12 pass between the bars as the transport moves forward to apply the blank. Immediately after the blank is applied, and just as the form begins to leave station I the first pressure bar 116 swings from the position shown in FIG. 19 to that shown in FIG. 20 where it presses and holds down the lower edge 30 of the blank B on the slightly flattened form side wall. At the same time radiant heater rod 140 is moved into place adjacent the end of exposed edge 30 and the adjacent edge 32.

The bar 118 also moves from the position shown in FIG. 19 to engage the edge 32 and move it adjacent the radiant heater rod. It will be noted in FIG. 20 that the edge 32 is not in contact with the edge 30, but rather is positioned immediately adjacent the heating rod 140 so that it too may be heated by it. The movement of the bar 118 takes place as the form reaches station II, while the radiant heater and the bar 116 move to the position shown in FIG. 31 during actual movement of the form 86 from station I to station II.

In station III as shown in FIG. 21 the bar 118 moves against the edge 32 of the blank B so as to press it firmly against the exposed end of edge 30. The pressure applied by the bar 118 serve not only to seal the two edges together but in addition to compress the seam so that the stock thickness of the container at the seam is only slightly greater than the stock thickness of the remainder of the container side wall. The bars 116 and 118 remain in the position shown in FIG. 21 in stations III and IV so that sufficient time is allowed for proper bonding of the two lapped edges. As the form moves into stations V and VI the bars 116 and 118 are open substantially to the position shown in FIG. 19. As indicated, the chain and sprocket mechanism shown in FIG. 18 in cooperation with an actuator (not shown) disposed beneath the turret move the bars to the various positions described.

In FIGS. 22 and 23 the actuating mechanism for the heater rod 140 is shown. The rod 140 is carried between a pair of supports 170 in turn pivotally mounted on a rocket shaft 172 which is carried by arms 174 fixed to the frame of the machine. The rocker shaft 172 is connected to a crank 176 at one end, and rotation of the crank arm 176 about the axis of the rocker shaft rotates the shaft to in turn raise and lower the supports 170 that carry the heater rod 140. The free end of the crank arm 176 is connected to a rod 178 which extends downwardly along the side of the machine, and the bottom of rod 178 in turn is anchored to the outer end of radial lever 180. When the outer end of lever 180 moves downwardly, the rod 178 moves downwardly with it and turns the crank. As shown in FIG. 22 the lever 180 is pivoted about the support pin 182, and the inner end 184 of the lever moves up and down in response to up and down movement of actuator 186. Thus the actuator 186 controls the movement of the heater rod 140 between the positions shown in FIGS. 19 and 20; that is, between its operative and inoperative positions.

MAIN TURRET AND ACTUATOR DRIVE

FIG. 22 also illustrates in detail the drive for the turret 84. In that figure the drive mechanism 87 is shown to include a main drive motor 190 connected to gear box 192 which rotates the main shaft 82 in stepwise rotation so that the several forms 86 move from station to station and pause in each. The gear box 192 also rotates cam 194 continuously, and a track 195 in the outer face 196 of the cam controls the cam follower 198 carried by the vertically moveable column 200. The column 200 in turn carries a horizontal foot 202 which supports and moves the actuator 186. That is, as the cam 194 rotates, the cam following 198 moves up and down as determined by the contours of the track in the cam face 196 so as to raise and lower the column 200 which through the foot 202 raises and lowers the actuator.

In FIG. 22 a sprocket 204 is shown carried by the main turret shaft 82, and its chain 206 rotates the turret 208 of the rimming mechanism which forms part of the assembly and which is described in detail below.

STATION II—BOTTOM INSERT

In station II an operator applies the preformed bottom 24 manually to the form 86 so that it lies within the overhanging edge 28 of the side wall blank B as in FIG. 5, and the bottom 24 is supported in position by the overhanging edge 28 of the blank B. Insertion of the preformed bottom 24 does not in any way interfere with the operation of the side sealing operation shown in FIGS. 19 to 21.

STATIONS III AND IV—HEAT BOTTOM EDGE OF SIDE AND BOTTOM

Precisely the same operation takes place in stations III and IV on each of the partially formed containers carried on the forms. In each station a generally vertically extending arm 220 is pivotally supported at its bottom on a pin 222, and the pin in turn is carried on the end of an arm 224 which extends generally horizontally under the machine to the central actuator 186. The arrangement is shown in detail in FIG. 24 and is suggested diagrammatically in FIG. 4. The horizontal arm 224 is pivoted on the frame on shaft 228 in a manner similar to the horizontal arm 180 shown in FIG. 22, and the arm 224 carries a fixed link 226. Thus, when the actuator 186 moves up and down, arm 224 pivots on shaft 228, and link 226 moves with it. A spring 230 connects the top of the link 226 with the vertical arm 220, and the spring and link connection between the arms 220 and 224 impart some flexibility into the actuation, which will be better appreciated below.

A heater 232 is carried on the top of the arm 220 and moves to the position shown in FIG. 6 to apply heat directly to the adjacent edges of the bottom margins 38 and 40 of the bottom 24 and side wall blank B respectively. The heater 232 directly engages those margins so as to apply heat to each. The heater 232 is moved to the operative position from that shown in FIGS. 4 and 24 by downward movement of the actuator 186. When the actuator moves down, the horizontal arm 224 pivot about its axis 228 and carries the link 226 with it. The spring 230 in turn pulls the vertical arm 220 until the heater 232 engages the margins of the container. The heater 232 raises the temperature of the plastic material sufficiently to make the juncture of the bottom blank and side wall blank molten. A coating of Teflon or other similar material on the surface of the heater which engages the margins will prevent the plastic material of the blanks from sticking to the heaters. The heating step is carried out at each of stations III and IV so as adequately to heat the plastic for subsequent bonding. Although sufficient heat could be applied at one station by slowing the step by step rotation of the turret, such a change would obviously adversely effect the machine output, and the two stage heating is used to avoid this result.

STATION V—SEALING BOTTOM TO SIDE WALL

In station V the molten margins of the bottom blank and side wall blank are spun together by a rotating iron 240 provided with a groove 242 on its face, which receives the adjacent margins of the blanks to form them to the contours shown in FIGS. 1 and 1B and seal them together. The rotating iron 240 is carried on a stub shaft 244 on the upper end of arm 246 which resembles arm 220 that carries the heater 232. The arm 246 is moved by horizontal lever 248 through link 250 and spring 252 in a manner identical to that described above. The stub shaft 244 carries a sprocket 254 having a chain 256 driven by a motor (not shown) mounted on the frame. Thus after the bottom margin of the assembled container is heated in stations III and IV, the rotating iron 240 in station V engages the margin of the container, and its groove 242 spins the margin to form a liquid tight seal. In the form of iron 240 shown in FIG. 25, fins are mounted on its periphery to dissipate the generated heat.

STATION VI

In station VI the wholly formed container is removed from the turret 84 by an operator positioned adjacent that station, and the operator places each formed container on the secondary turret 208 which performs the rimming operation. It will be appreciated that when the container is removed at station VI, the upper end of the side wall is not rolled over as shown in FIG. 1, but rather the side wall is straight and terminates in a straight rim at edge 26. The rolled rim configuration adds significantly to the utility and acceptability of the product.

RIMMING TURRET

The rimming turret 208 shown in FIGS. 3 and 4 includes a central shaft 260 which carries a rotating turret plate 262 from which depend five basket-like container holders 264. These baskets are shown in detail in FIGS. 26 and 28. Each includes a rim 266 embedded in the turret plate 262 and has a raised lip 268 about which the upper edge of the container side wall is turned to form a rolled rim. A number of rod supports 270 extend downwardly from the rim 266 and together carry base 272 which supports the bottom of the formed container. The base 272 is provided with an opening 274 to facilitate ejection of the formed containers after the rim is rolled.

A platform 276 is disposed above the turret plate 262 and carries the various sub-assemblies which combine to form the rim on the container. The several steps in the operation are conducted in five stations identified by the letters A through E. Briefly the functions performed in each station are as follows:

Station A—container from turret 84 loaded into holder 264.

Stations B and C—upper margin of side wall heated.

Station D—heated upper margin rolled over lip 268.

Station E—fully formed container removed.

These several steps are described in detail below in connection with the associated parts of the machine.

The upper platform 276 does not extend over station A (as well as station E) so as to provide access to the turret platform 262 and the depending basket holder 264 below to facilitate insertion of the container to be rimmed into the holder in station A. No other function is performed in this station.

STATIONS B AND C

In stations B and C an assembly as shown in FIG. 26 is provided. The assemblies are identical, and each is provided to direct heat to the rim before the rolling operation. The assembly includes a bridge 278 which supports a cylinder 280 whose piston rod 282 extends down through the bridge and carries heater 284. The lower surface 286 of the heater 284 is provided with an angular notch 288 which receives the upper edge 26 of the side wall and spans the lip 268 in the basket rim. By actuation of the cylinder 280, the piston rod 282 moves the heater 284 into engagement with the upper edge 26 of the sidewall. Thus, in stations B and C heat is directed to the rim prior to the rolling operation which is carried out in station D.

STATION D—RIM ROLLING

The apparatus mounted on the platform 276 in station D is shown in detail in FIG. 27. This assembly resembles the assemblies of FIG. 26 in that a bridge 290 is provided which supports cylinder 292 whose piston rod 294 extends down through the bridge and carries a rotatable plate 296. A sleeve 298 surrounds the piston rod 294 within the bridge 290, and the sleeve 298 includes a vertically extending slot 300 which receives a pin 302 carried by the piston rod. A sprocket 304 is secured to the lower end of the sleeve 298 immediately above the platform 276, and a chain 306 driven by motor 308 imparts rotation to the sleeve 298. By means of the pin and slot connection between the sleeve and piston rod, rotation of the sleeve imparts rotation to the rod and consequently to the rim rolling plate 296.

The lower surface of the plate 296 includes a rim rolling groove 310 which engages the previously heated upper edge of the side wall of the container, and rotation of the plate 296 causes the edge 26 to roll over the lip 268 of the basket, which supports the container. To dissipate the heat generated by this operation, fins 312 are preferably provided on the upper surface of plate 296.

STATION E

In station E the formed container with the rolled rim is removed. In FIG. 28 the assembly for ejecting the container is illustrated. A cylinder 316 is mounted on the lower platform 314 below the turret plate 262, and the piston rod carries a lift 218 of small enough diameter to be able to enter the basket 264 through the opening 274 provided in its base 272. The lift is designed to engage the bottom of the container disposed in the basket in station E and lift the container partially out of the basket so that it may be readily grasped by an operator and be removed from the machine. The same operator who removes the containers from station VI of the main turret 84 and deposits them in station A of the secondary turret may also remove the fully formed containers from station E.

FABRICATION OF CONTAINER 50

Figure 29:
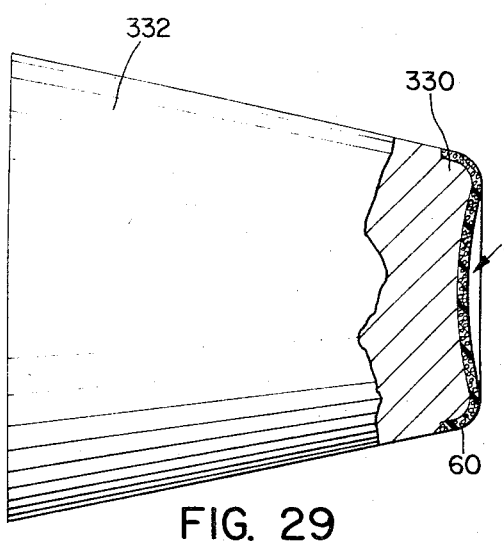

The foregoing description of the machine has been presented as it may be utilized in the manufacture of the container of FIG. 1. To fabricate the container of FIG. 2, the sequence of steps performed on turret 84 is somewhat changed. While in the procedure described the preformed bottom is inserted within the overhanging edge of the side wall blank B in station II, to fabricate the container of FIG. 2 the preformed bottom 54 is mounted on the form before the side wall. Therefore, in station VI in accordance with this alternate method, the preformed bottom is placed on the end of the form, which is shaped to receive it, as shown in FIG. 29. Thus, the end 330 of form 332 is specially contoured to receive the bottom 56.

Figure 30:
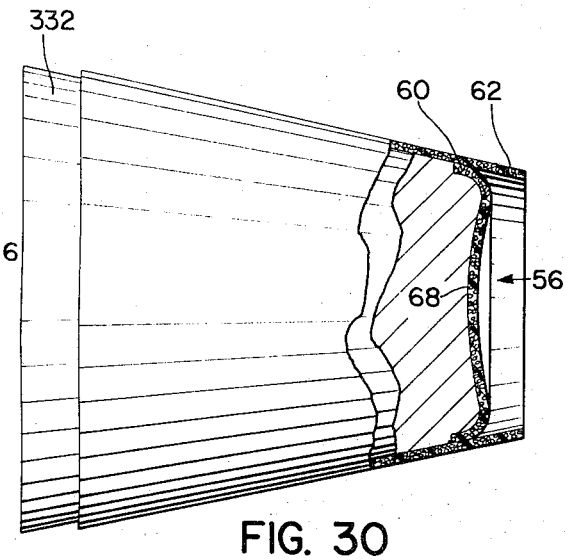

In station I the side wall is applied as in the previously described operation so that the container parts appear as in FIG. 30.

Figure 31:
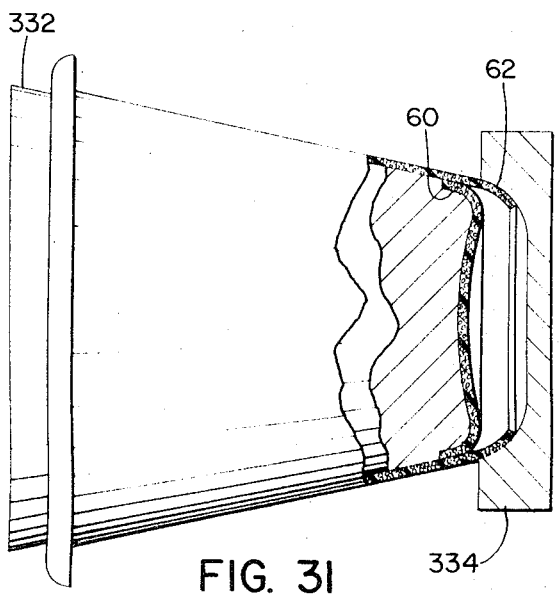
Figure 32:
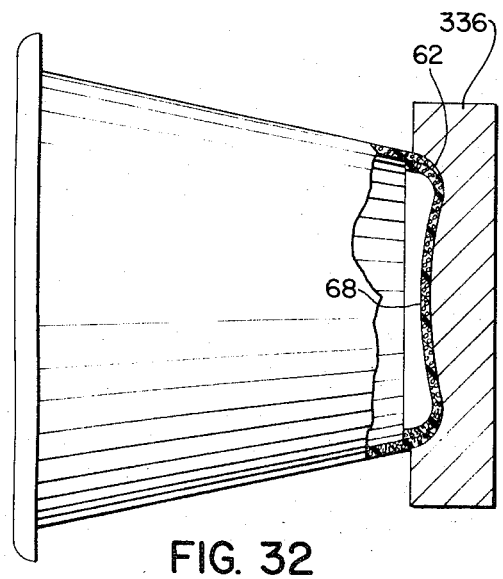

Next in stations II–IV, just as described above, the side wall lapped seam is formed, and in station III the bottom margin of the side wall may be heated by heater 334 as suggested in FIG. 31. In station IV the forming plate 336 may perform its function as suggested in FIG. 32 to roll the margin of the side wall blank over and seal it to the bottom. In station V the formed container may be removed and placed in station A of the secondary turret 208. The several rim rolling steps are as described above.

In the foregoing description the method and apparatus of this invention have been described in sufficient detail to enable a person of ordinary skill to practice this invention. It is to be appreciated that changes may be made in the method and apparatus within the scope of this invention, and the invention is not limited to the manufacture of the containers of FIGS. 1 and 2. Thus, the machine and method described may be used to manufacture containers of a very wide variety of shapes and sizes other than the conical shape shown, i.e., square, rectangular, oval, etc. The different shapes obviously would involve the use of forms of other shapes. It would not be practical to use spinning tooling with other shapes, but sealing and rimming may be carried on without spinning, although spinning makes these operations less critical and the tooling less costly.

What is claimed is:

1. A container forming machine comprising a frame,
    a turret mounted for rotation on the frame,
    a plurality of forms having side wall and bottom wall surfaces mounted on the turret and each adapted to receive a side wall blank about its side wall surface,
    a first station on the frame adjacent the turret and means in that station for applying a blank to each form as each form enters said station,
    a magazine mounted on the frame in the first station for holding a side wall blank above the form in that station,
    means for removing a blank from said magazine,
    said means in the first station including said removing means and forming means for partially forming each blank into a cone and thereafter placing the partially formed conical side wall blank on the form in that station,
    stop means mounted on each form for registering the blanks on them in the desired position,
    heating and clamping means mounted on the frame in association with each form for heating the sides of the blank by positioning a radiant heater between facing surfaces of the blank to heat said facing surfaces to be lapped and thereafter clamping said facing surfaces together in lapped relation to form a lapped side seam for the container blank,
    a second station on the frame disposed adjacent the first station in which station a bottom blank may be applied to the forms as they enter said station with the bottom including a peripheral flange lying in face to face contact with the inner surface of the side wall blank on the form over at least a portion of the axial extent of the flange when both side wall and bottom blanks are in place on the forms,
    a heater mounted on the frame in a third station adjacent the turret and movable to engage at least the side wall blank on the turret to make it molten at the region where it engages the bottom as each form is in that station,
    a forming tool mounted in a fourth station on the frame adjacent the turret for shaping and sealing the molten portion of at least the side wall while on the form and immediately after it is heated to precisely shape the union between the bottom and side wall, and a fifth station adjacent the frame through which each form passes for removing the container on each form.

2. A container forming machine as described in claim 1 further characterized by said second station following said first station in sequence about the turret so that the bottom is applied to the form after the side wall blank.

3. A container forming machine as described in claim 1 further characterized by said second station preceding the first in sequence about the turret so that the bottom is applied to the form before the side wall blank.

4. A container forming machine as described in claim 1 further characterized by a second turret mounted on the frame, and means mounted on the frame about the second turret for rolling the rims of containers transferred to it.

5. A container forming machine as described in claim 1 further characterized by said heating and clamping means including a pair of clamping bars with each form and movable therewith, and a heater mounted on the frame, and means connected to the bars and heater for causing them to operate sequentially to first hold one edge of a side wall blank on the form, then heat the adjacent edges of the blank, and next firmly press the edges together to seal them in overlapping relationship.

6. A container forming machine as described in claim 4 further characterized by said second turret including a plurality of basket shaped holders for receiving the containers formed on the first turret, a heater on the frame adjacent the second turret and means for moving it into engagement with the upper edge of the side wall of the container, and forming means on the frame adjacent the second turret for rolling the heated edge into a down turned rim.

7. A container forming machine as described in claim 6 further characterized by said forming means comprising a rotatable plate having a groove for receiving the upper edge, and means for rotating the plate as it engages the edge to turn it over.

8. A container forming machine as described in claim 1 further characterized by said means in the first station including a suction device for carrying the blank from the magazine, a pair of folding plates disposed below the magazine which move toward and away from one another to receive the blanks and form them into a substantially conical form, and drive means connected to the suction device and folding plates for moving the device from the magazine to the plates and for moving the plates together to form the blank.

9. A container forming machine as described in claim 8 further characterized by said drive means moving said plates while carrying a blank in the direction of the form to deposit the blank on the form.

References Cited

UNITED STATES PATENTS

| | | | |
|---|---|---|---|
| 2,665,738 | 1/1954 | Caskin | 56—499 |
| 3,533,332 | 10/1970 | Young et al. | 93—39.3 |
| 3,468,226 | 9/1969 | England et al. | 93—39.3 |
| 3,343,465 | 9/1967 | Albert | 93—39.3 |
| 3,336,847 | 8/1967 | Durat | 93—39.3 |
| 2,942,530 | 6/1960 | Bodendoerfer | 93—39.3 |
| 3,505,933 | 4/1970 | Schmidt | 93—39.3 |
| 3,049,979 | 8/1962 | Sayford, Jr. | 93—39.3 |
| 3,438,824 | 4/1969 | Balamuth | 156—69 |
| 3,289,552 | 12/1966 | Corazzo | 93—39.3 |
| 2,608,914 | 9/1952 | Merkle | 93—36.5 R |
| 3,063,347 | 11/1962 | Cummings | 93—39.3 |
| 3,065,677 | 11/1962 | Loeser | 93—36.5 R |
| 3,658,615 | 4/1972 | Amberg | 156—218 |

CHARLES E. VAN HORN, Primary Examiner

B. J. LEWRIS, Assistant Examiner

U.S. Cl. X.R.

156—499, 571